Sept. 29, 1942. W. PFAHL 2,297,244
CIRCULAR ROLLING PRESS FOR BRIQUETTING FINE COAL AND THE LIKE
Filed July 18, 1939
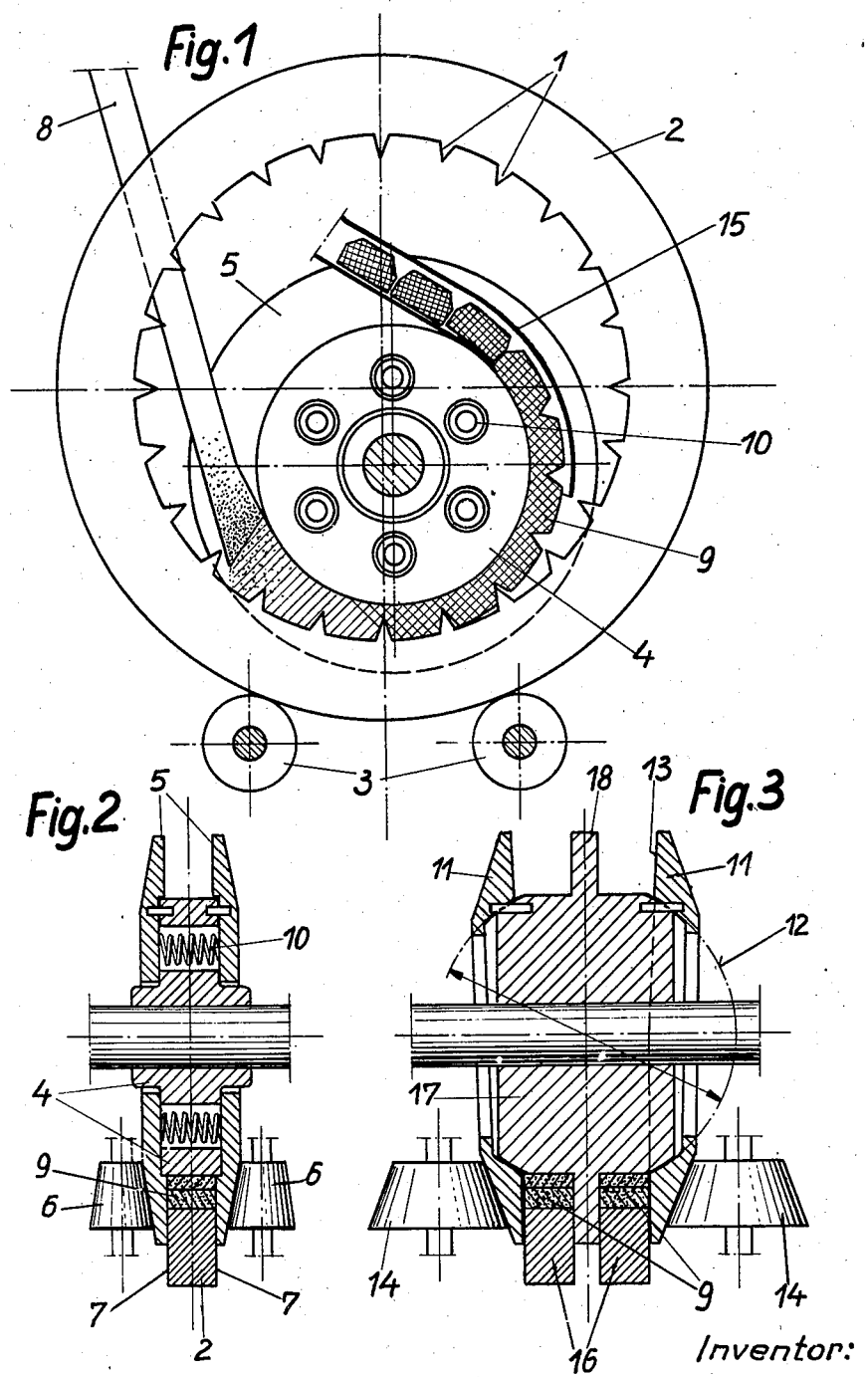
Inventor:
Werner Pfahl Patented Sept. 29, 1942

2,297,244

UNITED STATES PATENT OFFICE 2,297,244

CIRCULAR ROLLING PRESS FOR BRIQUETTING FINE COAL AND THE LIKE

Werner Pfahl, Meuselwitz, Germany; vested in the Alien Property Custodian

Application July 18, 1939, Serial No. 285,139
In Germany July 18, 1938

5 Claims. (Cl. 25—21)

In contra-distinction to the so-called ovoid presses, in circular rolling presses there takes place not only a shaping but a regular rolling process which can be carried out under such high pressure that in order to obtain sufficiently solid briquettes of coal, lignite, peat, bituminous mineral, and other minerals, very little if any binding material is necessary.

The best known circular rolling presses consist of a circular runner, arranged vertically and mounted on rollers, having an inner smooth press groove in which enters a small press wheel provided with teeth. The fine coal to be briquetted passes continuously into the press groove where it is compressed under the high pressure of the press wheel into a coherent, circular shaped rope, which has on its inner side indentations corresponding to the teeth of the press wheel. The purpose of these indentations is to facilitate the separation of the rope of coal into individual briquettes.

Circular rolling presses of the kind described have a number of disadvantages: The teeth of the press wheel must dig strongly into the previously more or less compressed rope of coal, so that considerable pressure impulses occur which result in non-uniform compression of the briquettes. Detrimental tensions and fissures in the briquettes are therefore for the most part unavoidable. These disadvantages are the more important the longer the teeth of the press wheel are made. On the other hand the use of very short teeth has the undesirable consequence that the rope of coal breaks up in irregular pieces for which the name "briquettes" is not suitable. A further disadvantage has been found to be that hard fine coal tends to flow in the smooth press groove whereby the rolling process is made much more difficult.

All these disadvantages disappear if the teeth necessary for sub-dividing the rope of coal are arranged not on the press wheel but on the runner, so that the press wheel is made cylindrically smooth. In this case the teeth need no longer dig into the previously compressed rope of coal since they are at rest relatively thereto. The compression therefore proceeds completely free from impulses and uniformly. Since the length of the teeth can be chosen almost as large as the thickness of the rope of coal, the indentations are so deep that sub-division of the rope into individual briquettes of the same shape and size is completely assured. Moreover a flowing of the fine coal in the press groove is impossible, since the coal is dammed up by the teeth of the circular runner.

The use of circular rolling presses of this kind has hitherto been attended by considerable difficulties because the release of the rope of coal from the press groove did not function unobjectionably in practice. The present invention relates essentially to suitable means for avoiding these difficulties.

The invention is illustrated in the accompanying drawing in which:

Fig. 1 shows a longitudinal section through a circular rolling press,

Fig. 2 a cross-section through the press wheel and the lower part of the circular runner, and Fig. 3 a similar cross-section through a particular constructional form of the press.

A circular runner 2 provided on its inner side with teeth 1 is mounted on rollers 3. Within the circular runner 2 is a small press wheel 4, the axis of which can be pressed towards the circular runner by spring force, or hydraulic or pneumatic pressure. The cylindrically smooth press wheel 4 is provided on both sides with movable boundary members or flanges 5 which at the bottom (in the neighbourhood of the pressing point) are pressed by conical pressure rollers 6 against the side surfaces 7 of the circular runner 2, and at the top (diametrically opposite to the pressing point) are spread apart.

The fine coal to be briquetted flows continuously through the delivery pipe 8 into the press groove which is formed on the one hand by the circular runner 2 and on the other hand by the two flanges 5 of the press wheel 4. The rope of coal 9 here formed by the suitably high pressure of the press wheel 4, in consequence of the expansion which sets in with decreasing compression pressure, wedges itself with great force between the flanges 5 the distance between which is here fixed by the pressure rollers 6. In consequence the rope of coal 9 is carried on not by the circular runner 2 but by the press wheel 4.

In order to facilitate the release of the rope of coal clamped between the flanges 5, the two flanges must be spread apart at the top. This may for example be effected by springs 10 which are built into the body of the press wheel. A technically complete solution of this problem is given by a further feature of the invention according to which the boundary member 11 (Fig. 3) is mounted on a spherical surface 12 and on its inner surface is made slightly conical, so that the spreading apart of the boundary members takes place automatically when they are pressed together below by the pressure rollers 14.

The sub-division of the rope of coal into individual briquettes is very simple. According to a feature of the invention, the rope of coal 9 carried by the press wheel 4 is led into a conduit 15 lying adjacent the cylindrical outer surface of the press wheel which conduit forces the rope 9 bent into circular shape to become straight, whereby breakage of the rope at the indented points takes place by itself.

As is shown in Fig. 3, merely by the use of a double circular runner 16, it is possible to press two ropes of coal simultaneously. The press wheel 17 has in this case three boundaries of which the middle 18 is fixedly connected with the press wheel whilst the two outer boundaries 11 are movably mounted.

I claim:

1. A circular rolling press for the briquetting of fine coal and the like comprising a rotatable, circular, internally toothed runner, a press wheel eccentrically arranged relatively to said runner, rotatable in the same direction as said runner and having a cylindrical surface facing the teeth on said runner, movable boundary members on each side of said press wheel and forming the flanges of a groove extending around said surface substantially concentric with said wheel, said members being tiltable, and means for forcing said boundary members towards one another at a position substantially adjacent the position where said runner passes away from said wheel during rotation, so that the pressed strand of briquets is detached from the runner, and remains on the press wheel.

2. A circular rolling press for the briquetting of fine coal and the like comprising a circular toothed runner, a press wheel eccentric with said runner but rotatable in the same direction and having a cylindrical surface facing the teeth on said runner, movable boundary members on each side of said press wheel, means for forcing said boundary members towards one another at a position substantially adjacent the position where said runner passes away from said wheel during rotation, so that the pressed strand of briquets is detached from the runner, and remains on the press wheel, and spring means within said press wheel for spreading said boundary members apart at a diametrically opposite point.

3. A circular rolling press for the briquetting of fine coal and the like comprising a circular toothed runner, a press wheel having a cylindrical surface facing the teeth on said runner and having another part of its external surface of spherical shape, movable boundary members on each side of said press wheel having internal surfaces of conical shape engaging said spherical surface, and means for forcing said boundary members towards one another at one point whereby owing to the spherical surface on which said boundary members engage the said boundary members are forced apart at a point diametrically opposite to the first named point.

4. A circular rolling press for the briquetting of fine coal and the like comprising a rotatable, circular, toothed runner, a press wheel having a cylindrical surface facing the teeth on said runner, tiltable boundary members on each side of said press wheel, said wheel and members being substantially concentric with each other but eccentric relatively to said runner and rotatable in the same direction as said runner, a chute tangentially contacting said wheel and adapted to lift a strand of briquets from said wheel, and means for forcing said boundary members towards one another from the point where said wheel is closest to said runner in the direction of rotation of the wheel substantially up to said chute.

5. A circular rolling press for the briquetting of fine coal and the like comprising a rotatable, circular, internally toothed runner, a press wheel eccentrically arranged relatively to said runner, rotatably in the same direction as said runner and having a cylindrical surface facing the teeth on said runner, movable boundary members on each side of said press wheel and forming the flanges of a groove extending around said surface and substantially concentric with said wheel, said members being tiltable, and means for forcing said boundary members towards one another at a substantially fixed distance away from the position where said runner passes away from said wheel during rotation, such force being released and said members being allowed to spread apart only after the teeth of the runner have disengaged from the strand of briquets passing along on said wheel.

WERNER PFAHL.